and the emulsifier is added to water in the desired proportion, it is important that there be a rapid, indeed, almost spontaneous, dispersion of the toxicant material so that relatively little stirring or agitation, if any, is necessary. Since the water to which the concentrate is added may vary widely in hardness, depending upon local conditions, it is necessary that the emulsifying agent be such that the desired rapid dispersion is effected in the available water of any given locality.

United States Patent Office 3,243,382
Patented Mar. 29, 1966

3,243,382
EMULSIFYING AGENTS
Keith L. Johnson, Park Forest, Ill., assignor to Swift & Company, Chicago, Ill., a corporation of Illinois
No Drawing. Filed June 6, 1962, Ser. No. 200,357
8 Claims. (Cl. 252—354)

The present invention relates to improvements in emulsions of water-insoluble toxicants or pesticides primarily intended for agricultural use for the control and elimination of pests infecting animals or plants and the like, and to emulsifying agents for use in connection therewith. More particularly, the invention pertains to nonionic-anionic mixtures of surface-active agents which may be dissolved in oily materials for the purpose of making such emulsifiable compositions.

The present application is a continuation-in-part of application 177,968, filed on March 7, 1962.

A large number of organic, oil-soluble toxicant materials have been found to possess beneficial properties in the elimination of animal and vegetable pests, such materials being used as pesticides, herbicides, fungicides, rodenticides, germicides, fertilizers, etc. While such toxicants are ordinarily soluble in organic solvents, they are generally applied in highly dispersed form in aqueous suspensions or emulsions.

For convenience in handling and marketing such toxicants, they are commonly supplied in a mixture with emulsifying agents in the form of concentrates. Before use, these concentrates are admixed with water to secure a liquid suspension or dispersion containing the desired concentration of the toxicant, the spray liquid being then transferred to tanks of suitable size for use with the spraying equipment available to the user, or to dipping vats for treating animals or plants. The most important components determining the feasibility of such a system are the combination of surface-active agents that, when present, facilitate the production of a uniform solution or dispersion of the concentrate in the aqueous carrier which is generally the continuous medium or external phase.

Mixtures containing various concentrations of two or more types of surface-active agents have been disclosed for the particular purposes in the various arts. Combination emulsifiers in which one of the components is a salt of a sulfonated organic material and the other is a non-ionic surface-active agent have, in particular, been found useful in the preparation of readily emulsifiable oil concentrates.

The ratio between the anionic and nonionic component is varied from system to system to enable one particular set of surface-active agents to achieve optimum performance regardless of the variant hydrophobic or hydrophilic nature of the active agent or its carrier solvent. These systems have performed quite satisfactorily in a number of applications, but they do have several limitations imposed upon them. One of these limitations is that no one system has been found to operate in a satisfactory manner with all the commonly used toxicants. For this reason, several emulsifiers for specific systems must supplement these emulsifier pairs in actual practice. Toxicants such as Malathion, benzene hexachloride, tetraethyl pyrophosphate, and others have been particularly difficult to suspend or disperse.

There has also been a continued and persistent pressure in the agricultural chemical industry for emulsifiers that will function at lower and lower concentration levels. This pressure is due, at least in part, to economic reasons which are becoming increasingly important in the pesticide industry as it expands to broader and broader markets.

The use of such toxicants in household applications or on the farm places severe demands upon the emulsifiers which are used for effecting the dispersion of the toxicant substances. When a concentrate containing the toxicant, and the emulsifier is added to water in the desired proportion, it is important that there be a rapid, indeed, almost spontaneous, dispersion of the toxicant material so that relatively little stirring or agitation, if any, is necessary. Since the water to which the concentrate is added may vary widely in hardness, depending upon local conditions, it is necessary that the emulsifying agent be such that the desired rapid dispersion is effected in the available water of any given locality.

It is, therefore, an object of this invention to provide a system which is compatible with a greater number of toxicants than was previously possible.

It is also an object of this invention to produce a system which lends itself to lower use concentration and does not exhibit a high sensitivity to small differences in ratio between the various components of the emulsifier.

Another object is to provide a novel anionic-nonionic emulsifier.

Additional objects, if not specifically set forth herein, will be readily apparent to those skilled in the art from the detailed description of the invention which follows.

In general, the emulsifiers used in accordance with the present invention comprise a mixture containing both an anionic and a nonionic surface-active agent. The anionic component may be any of the anionic surface-active agents of the types used in the emulsifying mixtures of the prior art, in which the hydrophobic and lipophilic groups are so balanced as to provide water dispersibility. The nonionic component of the emulsifier comprises derivatives of oxirane-substituted aliphatic, including alicyclic compositions wherein the oxirane group is broken, and oxyalkylene-containing compounds of aliphatic mono or polyhydric alcohols mono or polyethers or esters are substituted thereon.

More specifically, the anionic component comprises mono-, di- or trivalent metal or amine salts of petroleum or alkyl, aryl or alkylaryl sulfonic acids or mono- or diesters of orthophosphoric or sulfuric acid. The organic moiety usually contains about up to 22 carbon atoms in the alkyl chain, while the salts may be alkali metal, alkaline earth metal, polyamine or ammonium salts. The nonionic component is usually produced by the catalyzed reaction between oxirane compositions of a hydrophobic nature with polyoxyalkylene alcohol, glycol ethers or esters. Preferred are the compounds resulting from the polyoxyalkylene alcohol or glycol reaction with the epoxidized fatty materials such as the epoxidized esters and glycerides in the presence of the Lewis acid catalyst. The nonionic component can also be formed by the alkylene oxide addition to fatty esters or glycerides that contain at least 3, and preferably 3–5, free hydroxyl groups wherein the free hydroxy groups are on the acid part of the ester or on both the acid and alcohol portion.

Generally, the nonionic component of the invention comprises derivatives of oxirane-substituted, aliphatic and alicyclic compositions wherein the oxirane group is broken and oxyalkylene-containing compositions and radicals of lower polyhydric alcohol ethers or esters are substituted on one carbon which before the reaction had formed the oxirane group and the adjacent carbon which had been the other carbon of the oxirane group is substituted with a hydroxyl group. The formation of the product can be represented as follows:

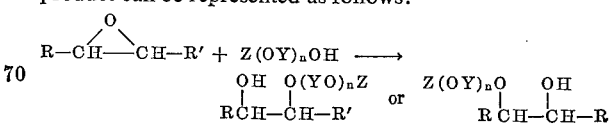

where R is alkyl cycloalkyl, cycloalkenyl, alkaryl or aryl group, R' is hydrogen or an aliphatic radical, Y is an alkylene or haloalkylene group and preferably of 2–6 carbons, $n$ is 1–100, and preferably 1–20, and Z is selected from the group consisting of acyl, aryl such as napthyl and phenyl, phenylalkylene, alkylphenyl, lower alkyl, hydrogen, hydroxy alkylene amino and acyl amido.

More specifically, the nonionic components of the instant invention include the products resulting from the catalyzed reaction between oxirane fatty compositions of a hydrophobic character and having a molecular weight, preferably above about 200, with alcohols having at least one available hydroxyl group. Catalysts most useful in insuring the desired reaction between the hydroxyl group of the alcohol and the oxirane group of the fatty composition are the strong Lewis acids and tertiary amines. At least one of the reactants must be bifunctional; that is, must possess 2 or more epoxy groups or 2 or more hydroxyl groups. Polyhydroxy compounds should not be reacted with polyepoxides since undesirable polymeric materials may result.

Highly effective surface-active materials are prepared by reacting monohydroxy-substituted compositions with polyepoxides. Similarly, highly desirable surfactants result from the reaction between oxirane-substituted compositions having an average of no more than about one epoxy group per molecule and polyols (di-, tri-, and tetrahydric aliphatic alcohol). If monoepoxides are reacted with monohydroxy-substituted ethers, the products are effective surface-active agents and also find application as intermediates in the production of surface-active agents.

Oxirane-substituted compounds which can be employed in producing the monpolymeric surface-active materials of the invention, as has been noted previously, include hydrophobic higher molecular weight organic compositions having one or more oxirane groups. These compositions comprise aliphatic and alicyclic compounds such as epoxidized higher fatty acid derivatives and oxirane-substituted carbocyclic materials. Epoxidized triglycerides represent a very convenient source of oxirane-substituted higher fatty acid and derivatives thereof and nonfatty epoxy-containing materials are represented by the epoxy-substituted vinyl benzenes such as ortho-, meta-, and para-divinyl benzene dioxide. The epoxy-substituted vinyl cyclohexenes have the epoxy group on the vinyl chain such as vinyl cyclohexene oxide, epoxy-substituted cyclohexenes having the epoxy group on the cyclohexene ring as vinyl cyclohexene dioxide and 3,4-epoxy-1-methyl cyclohexyl methyl-3,4-epoxy-1-methyl cyclohexene carboxylate, 6-methyl-3,4-epoxy-cyclohexylmethyl-6-methyl-3,4-epoxy cyclohexene carboxylate may also be used. Other oxirane-substituted materials include the oxirane-substituted cyclopentadiene such as dicyclopentadiene oxide and dicyclopentadiene dioxide, as well as the diepoxides from condensation products such as the diglycidyl ether of bisphenol A.

The oxirane-containing higher fatty acids (8–22 carbons) and derivatives thereof represent a very convenient source of the oxirane reactant. Epoxidized animal, vegetable, and marine triglycerides are well known in the art, and examples of these materials include epoxidized soybean oil, epoxidized linseed oil, epoxidized safflower oil, epoxidized perilla oil, epoxidized lard oil, epoxidized tallow, epoxidized fish oils, such as menhaden and sardine oil, as well as epoxidized sperm oil. These naturally occurring ethylenically unsaturated materials can be epoxidized by methods well known in the art to provide compositions having varying amounts of oxirane substitution, usually between 4 and 11% oxirane oxygen.

Other aliphatic alcohol esters of oxirane-substituted higher fatty acids such as mono- and dihydric alcohol esters wherein the alcohol portion of the ester is a monohydric aliphatic alcohol having 1–8 carbons or dihydric aliphatic alcohol having 2–6 carbons are also contemplated. Suitable monohydric alcohols providing the alcohol moiety of the epoxy fatty acid ester, including methyl, ethyl, propyl, isopropyl, butyl, isobutyl, amyl, isoamyl, hexyl, heptyl and octyl alcohols. Dihydric alcohols which may be employed to provide the alcohol moiety of the epoxy fatty acid ester include ethylene glycol, 1,2-propanediol, 1,3-propanediol, dimethyl ethylene glycol, trimethylene glycol, tetramethylene glycol, up to and including hexamethylene glycol. Polyhydric alcohol esters of the oxirane-containing fatty acids which can be employed to provide the oxirane-containing reactant include the epoxy higher fatty acid esters of tri-, tetra-, penta-, and hexahydric alcohol esters of the fatty acid moiety. Included within this group are those aliphatic alcohols having 3–6 carbons and 3 or more alcohol groups. These alcohols include glycerol, erythritol, pentaerythritol, and hexatols such as mannitol and sorbitol. Synthetic triglycerides such as epoxidized triolein, epoxidized trilinolein, and epoxidized trilinolenin are also contemplated. Generally, esters of acids of the type such as epoxidized oleic acid, epoxidized linoleic acid, and epoxidized linolenic acid are preferred.

Esters of epoxidized higher fatty alcohols with lower mono- and polycarboxylic aliphatic acids are also contemplated. Included in this group are 9,10-epoxystearoyl acetate, di(9,10-epoxystearoyl) maleate and di(9,10,12,13-diepoxystearoyl) adipate.

The hydroxyl supplying reactant can be selected from the group consisting of ethers and esters of aliphatic polyhydric alcohols. Examples of compositions of this type are the alkyl phenol-polyoxyalkylene glycol adducts such as nonyl phenol-ethylene oxide condensation products wherein 6–20 mols of ethylene oxide are combined with each mol of nonyl phenol. The alkyl group on the benzenoid ring of such compositions can contain up to approximately 22 carbons and preferably 8–14 carbons and can be either a straight or branched chain. Lower alkyl and alkenyl ethers such as the 1–4 carbon ethers of polyoxyalkylene glycol are also contemplated. The polyoxyethylene glycols usually range in molecular weight from about 150 to about 1050.

The esters of polyoxyalkylene glycol include the higher fatty acid esters containing 8–22 carbons in the fatty acid portion of the molecule. These acids are obtainable from naturally-occurring fats and oils. Tall oil fatty acid esters of polyoxyalkylene glycol having 12–18 oxyethylene groups are typical of the higher fatty acid esters of polyoxyalkylene compounds. The hydroxy-supplying reactant can also be selected from the alkylene oxide condensation with fatty alcohols, fatty mercaptans, fatty acid amides, fatty amines and alkanolamines. The number of oxyalkylene groups introduced should be sufficient to impart water dispersibility and is well understood in the art. The alkoxylated alcohols, phenols, esters, amides, etc., can be the mixed alkoxylated compounds such as containing a chain of polyoxypropylene and polyoxyethylene.

The condensation products of the alkylene oxides of the fatty alcohols and mercaptans are ether or thioether compounds. Usually the alcoholic portion corresponds to the fatty acids above; namely, containing 10–22 carbon atoms in the alkyl chain. 1–100 oxyalkylene groups may be introduced; however, normally 1–40 is sufficient with 1–20 being preferred. Specific examples include alkylene oxide condensates of octyl mercaptan, nonyl mercaptan, decyl mercaptan, lauryl alcohol, oleyl alcohol, and cetyl alcohol, etc.

Similar hydroxy compounds are produced by the reaction of alkylene oxides with the fatty amines and amides, an example being polyoxyethylene oleic acid containing 30 ethylene oxide units.

At this point, it should be mentioned that the commercial products provided by the condensation of alkylene oxides with the active hydrogen compounds are actually mixtures containing different numbers of alkylene oxide units, of which one predominates. For example, nonyl phenol-9 moles alkylene oxide denotes the compound in which the predominant unit contains 9 alkylene oxide groups, but is accompanied by smaller proportions of adducts containing smaller and larger numbers of units.

Typical structure of the adjacent hydroxyl and ether groups on the hydrocarbon chain which before reaction were occupied by the epoxy group are as follows:

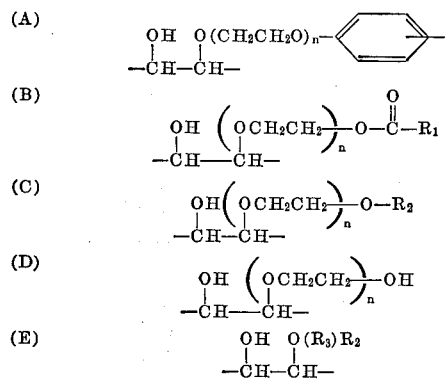

where X is hydrogen or aliphatic hydrocarbon radical of 8–14 carbons, $R_1$ is an aliphatic hydrocarbon radical of 9–21 carbons, $R_2$ is an aliphatic hydrocarbon radical of 1–6 carbons, $R_3$ is the residue of an aliphatic polyhydric alcohol of 3–6 carbons, and 3–6 hydroxyl groups.

Structures A, B, and C represent the products formed when polyoxyalkylene ethers having only one available hydroxyl group or polyoxyalkylene esters having only one available hydroxy group are reacted with mono- or poly-epoxides. Generally, the compositions of the invention will contain from 1 to 5 of the groups represented by A, B, and C. The structures represented by D and E are typical of the reaction between polyhydric alcohols and oxirane-containing compositions having only one oxirane group. Only one of these structures will be present in the product.

While the compositions illustrated have, for convenience, been shown containing oxyethylene groups, it should be understood that compositions made up of oxypropylene, oxybutylene, oxyamylene, and oxyhexylene groups are also encompassed by the invention.

In that embodiment of the invention wherein polyols are reacted with compounds having not more than one epoxy group per molecule, the polyol can be any aliphatic polyhydric alcohol having two or more hydroxy groups. Polyols of this type include, in addition to glycol, such as ethylene glycol, propylene glycol, tetramethylene glycol, diethylene glycol, dipropylene glycol, polyoxyalkylene glycols having 2–20 polyoxyalkylene groups, glycerol, sorbitol, and generally those tri-, tetra-, penta-, and hexahydric alcohols having 3–6 hydroxyl groups and 3–6 carbons. These compounds can be combined with monoepoxides such as methylepoxy stearate, butylepoxy stearate, vinyl cyclohexene oxide, dicyclopentadiene oxide, etc.

The catalytic agent utilized in producing the nonionic component of the invention may be selected from the group consisting of strong Lewis acids and tertiary amines. Suitable catalysts include Friedel-Crafts type catalysts such as the halides of boron, iron, aluminum, silicon, antimony, tin, arsenic, zinc, and zirconium. Also, tertiary amines such as benzyl dimethylamine, lower trialkylamines, and trialkylolamines exhibit some catalytic activity. Boron trifluoride and boron trifluoride complexes are preferred, although lower alkoxides of metal such as aluminum and titanium isopropoxides and isobutoxides are also satisfactory. A catalytic amount of about 0.2 to 7% based upon the epoxide depending upon the activity of the specific catalyst will ordinarily be employed.

The ratio of oxirane-containing material to the alcohol composition, which are combined, is usually maintained so that there are sufficient hydroxyl groups to react with each epoxide group and insure that the degree of functionality in the reaction product is held at a minimum. If an excess of either reactant is to be employed, it is preferred that the hydroxyl compound be present in an excess. A 10% mole excess of the polyoxyethylene alcohol will insure that the material resulting will be essentially monomeric in form. This also allows for minor variations in the molecular weight of the polyoxyethylene alcohol and the oxirane level of the oil.

Since the polyoxyethylene alcohols and the epoxidized oils are not always mutually miscible, the reaction can be carried out in the presence of benzene, a highly effective cosolvent, at a level of approximately 33%. The benzene can be removed as an azeotrope by adding distilled water to the reaction mass and stripping off the volatile components.

Anionic surface-active agents utilized in the present invention includes the salts of the alkyl, aryl or alkyl aryl sulfonic acids, or mono- or diesters of orthophosphoric or sulphuric acids. For example, aromatic mono sulfonic acids wherein the benzenoid ring is substituted with up to five organic radicals is contemplated. Usually the organic sulfonic acid will contain no more than two benzenoid rings and may be substituted with radicals such as alkyl, polyalkyl, alkoxy, alkyl thio and polyalkoxy ether radicals. These radicals can contain up to about 30 carbon atoms. Particularly suitable anionics include the metal, amine and ammonium salts of alkyl substituted aromatic mono sulfonic acids wherein the aromatic moiety is the benzene or naphthalene radical. The alkyl radical usually contains up to about 22 carbon atoms and the aromatic moiety may be a hydroxyl substituted benzene or naphthalene.

Specific examples include the alkyl or polyalkyl benzene, naphthalene, naphthol, phenol sulfonic acids such as dodecyl benzene sulfonic acid, keryl benzene sulfonic acid, dinonyl benzene sulfonic acid, trihexyl benzene sulfonic acid, nonyl phenol sulfonic acid, lauryl naphthalene sulfonic acid, toluene, xylene, propyl benzene sulfonic acids, as well as tetradecyl benzene and octadecyl naphthalene sulfonic acids, etc. In the preparation of the salts of sulfonated organic compounds, it is common to dilute the sulfonic acid. The acid is then neutralized with a base. Among the metal reactants which are useful are the oxides, hydroxides, and salts. Particularly applicable are the alkali and alkaline earth metals such as calcium hydroxide, barium hydroxide, magnesium oxide, strontium oxide, beryllium oxide, zinc oxide, calcium carbonate, etc. Also, other polyvalent metals such as aluminum and chromium may be used.

The amines used to neutralize the sulfonic acids are the alkylene polyamines or alkyl or alkanol amines. Some specific amines include ethylene diamine, propylene diamine, diethyl triamine, methyl amine, ethyl amine, propyl amine, isopropyl amine, butyl amine, amyl amine, cyclohexyl amine, ethanol amine, diethanol amine, methyl ethyl amine, octyl amine, dodecyl amine, etc. Examples include butyl ammonium dodecyl benzene sulfonate, cyclohexyl ammonium keryl benzene sulfonate, ammonium dinonyl naphthalene sulfonate, etc. The amine salts of alkylated aromatic sulfonates containing up to about 14 carbon atoms or more are contemplated. Amine salts of the sulfonic acids wherein the amine has an atomic carbon to nitrogen ratio of from between 1:1 to 7:1 and preferably 4:1 to 5:1 are preferred. The amine salts may be prepared by dissolving the crude sulfonic acid in a solvent, such as benzene, and separating the lower sulfonic acid layer. The amine is then added and the solvent removed by distillation.

The following examples illustrate the production of the novel nonionic components of this invention and are presented herein merely for purposes of illustrating the invention.

*Example I*

Epoxidized soybean oil having an oxirane content of 6.95% was added to 640 grams of ethoxylated nonyl phenol. The ethoxylated nonyl phenol is the condensation product of 9.5 moles of ethylene oxide condensed with 1 mole of nonyl phenol. 250 grams of the epoxidized oil was added to a dispersion of 8 grams of a boron trifluoride-ethyl Cellosolve complex in the ethoxylated nonyl phenol. The mixture was stirred and an exothermic reaction took place as the polyoxyethylene ether reacted with epoxidized oil. The reaction product which was a yellow water-dispersible oil was tested for surface activity and the product functioned effectively as an emulsifying agent having low foaming characteristics.

*Example II*

A dispersion was formed of 7 grams of boron trifluoride-diethyl ether complex and 550 grams of a polyoxyethylene alcohol ether. The alcohol ether is the methyl ether of polyoxy ethylene glycol and has a molecular weight of about 550. The dispersion was agitated and 250 grams of epoxidized soybean oil having an oxirane content of 7.02% was slowly added to the dispersion. An exothermic reaction ensued. The product, which can be characterized as viscous liquid, showed excellent surface-active properties and facilitated the emulsification of a mixture of castor oil and unsaturated fatty acids.

*Example III*

2.0 grams of diethyl ethanolamine was dissolved in 100 grams of methyl Cellosolve and 250 grams of epoxidized soybean oil having an oxirane content of 7.02% was added while the mixture was agitated. Some heating to a temperature of about 70° C. was necessary to initiate the reaction. Heating at a temperature of 85° C. was maintained for a period of about 5 hours. The oily liquid reaction product had surface activity.

*Example IV*

8 grams of boron trifluoride-diethyl ether complex was dispersed in 640 grams of ethoxylated nonyl phenol as employed in Example I and 250 grams of epoxidized methyl oleate (oxirane content 4.94%) was added while the mixture was agitated.

*Example V*

3.7 grams of a boron trifluoride dihydrate was dispersed in 550 grams of the methyl ether of polyoxyethylene glycol having a molecular weight of 550 and to this dispersion 250 grams of epoxidized methyl oleate (oxirane content 4.94%) was added. An exothermic reaction took place which resulted in the production of a light colored oil.

*Example VI*

500 grams of polyoxyethylene glycol having a molecular weight of 1,000 was melted and 7 grams of anhydrous tin tetrachloride was dispersed in the liquid glycol. The dispersion was agitated and 250 grams of epoxidized methyl oleate (oxirane content 4.94%) was added. The exothermic reaction which resulted was permitted to go to completion and the product was tested for surface activity.

*Example VII*

8 grams of boron trifluoride-ethyl Cellosolve complex was dispersed in 640 grams of the ethoxylated nonyl phenol used in the production of the product of Example I and 140 grams of vinyl cyclohexene oxide was added while the mixture was agitated. The exothermic reaction resulted in a product which is a low foaming emulsifying agent.

*Example VIII*

A solution of 190 grams of sorbitol dissolved in 420 grams of dimethyl formamide was formed and the solution was agitated while 5 grams of anhydrous stannic chloride was added. 200 grams of epoxidized butyl linoleate (oxirane content 6.5%) was slowly added while the mixture was stirred. An exothermic reaction was initiated and the reaction mixture darkened. While the reaction was complete as indicated by termination of the rise in temperature, the product was tested as an emulsifier with benzene-water mixtures and was found to function effectively.

Diverse combinations of oxirane-containing materials and ethers and esters of polyoxyalkylene glycols can be reacted to produce compositions having unusual micellar properties leading to exceptional utility of the products as emulsifying and dispersing agents. The following examples illustrate the use of the nonionic-anionic emulsifiers of this invention and are not to be construed as limiting the scope of the invention.

*Example IX*

250 grams of epoxidized soybean oil having an oxirane oxygen content of 7% was added to 640 grams of nonyl phenol ethoxylated with ethylene oxide to a level of 63% in which there was dispersed 8 grams of boron trifluoride-ethyl Cellosolve complex. After the exothermic reaction had taken place the resulting product was tested for surface activity and was found to lower the surface tension of water and functioned effectively as an emulsifying agent exhibiting low foaming characteristics. The material was then mixed with 1,000 grams of the isopropyl amine salt of dodecyl benzene sulfonic acid dissolved in 1,600 grams of toluene. This solution at a level of 5 to 7 percent was found to effectively emulsify aromatic naphtha solutions of O,O-dimethyl-S-(1,2-dicarbethoxy ethyl) dithiophosphate containing 5 to 8 pounds of active ingredient per gallon.

*Example X*

250 grams of epoxidized soybean oil having an oxirane content of 7% was added to 550 grams of the monomethyl ether of a polyoxyethylene glycol having a molecular weight of approximately 550 in which had been dispersed 7 grams of boron trifluoride-diethyl ether complex. The resultant product was combined in solvent solution with 600 grams of the calcium salt of keryl benzene sulfonic acid. The resulting detergent emulsifier was found to perform effectively in a wide range of agricultural products including solvent solutions of benzene hexachloride, O,O-dimethyl-S-(1,2-dicarbethoxy ethyl) dithiophosphate, and the butyl ester of 2,4,5-trichlorophenoxy acetic acid.

*Example XI*

180 grams of linseed oil epoxidized to an oxirane oxygen level of 9% was reacted with 1,000 grams of polyoxyethylene glycol having a molecular weight of approximately 1,000 in which had been dissolved 1,100 grams of toluene and which had dispersed in it about 5 grams of anhydrous stannic chloride. After a reaction had taken place as evidenced by its exothermic character, the resulting material was combined with the N-methyl-butyl amine salt of dioleyl acid orthophosphate. The resulting material imparted good emulsibility to a variety of toxicant concentrates.

It is understood that any of the nonionic components mentioned hereinbefore may be utilized with any of the anionic surface-active agents set forth, the ratio of nonionic to anionic being in the range of from 1:9 to 9:1, with the preferred ratio lying from 1:3 to 3:1.

The emulsifiable concentrates produced in accordance with this invention are readily reduced to application condition by mixing in water. The concentration of the emulsion will, of course, vary in accordance with the particular toxicant, solvent, use contemplated, and the like, but in general will vary from about 2 to 10 percent of the concentrate by volume in aqueous emulsions. One factor to consider in preparing the emulsifying agents is the water hardness. The procedure employed for determining the proper proportions of anionic and nonionic components for use with any particular toxicant and its accompanying solvent are well understood in the art and involve a certain amount of routine testing since the most desirable proportions will vary depending upon the specific emulsifier, solvent, toxicant, water hardness, etc.

A wide variety of toxicants are rendered satisfactory by use of the instant emulsifiers. These toxicants include: DDT (dichloro-diphenyl trichloroethane), DDD (2,2-bis(p-chlorophenyl)-1,1-dichloroethane), 2,4-D (2, 4-dichlorophenoxy acetic acid), 2-4-5-T and esters thereof (2,4,5-trichlorophenoxy acetic acid), Toxaphene (chlorinated camphene containing 67–69% chlorine), Chlordane (contains 1,2,4,5,6,7,8,8-octachloro-4,7-methano - 3a,4,7, 7a-tetrahydroindane), Lindane (1,2,3,4,5,6-hexachlorocyclohexane), Methoxychlor (1,1,1-trichloro - 2,2 - bis(p-methoxyphenyl) ethane), Parathion (O,O-diethyl-O-p-nitrophenylthiophosphate), Dieldrin (1,2,3,4,10,10 - hexachloro-6,7-epoxy-1,4,4a,5,6,7,8,8a-octahydro - 1,4,5,8 - dimethano-naphthalene), Methyl Parathion (O,O-diethyl-O,p-nitrophenyl - thiophosphate), Chlorothion (O,O - dimethyl-O-p-nitro-n-chlorophenylthiophosphate), Malathion (O,O-dimethyl dithiophosphate of diethyl mercaptosuccinate), Chloro I.P.C. (isopropyl-N-(3-chlorophenyl) carbamate), Chloranil (2,3,5,6-tetrachloro-p - benzoquinone), etc.

The emulsification ability of the alkoxylated nonionic was tested and compared to that of the corresponding HLB ethoxylated nonyl phenols. The emulsification test was carried out in a system buffered to a pH of 7.0 with tris-(hydroxymethyl) aminomethane and sodium hydroxide and the emulsification was tested with 49.5 parts of water, 49.5 parts of oil, and 1 part of emulsifier. A dye was added to the oil phase to aid in identifying the samples and, also, to more sharply define the line between the creamy phase and a phase that had "oiled" out. In each case, the system was allowed to come to equilibrium by shaking for two hours on an "Eberbach" automatic shaker, then standing for 24 hours. After this period of standing, the samples were added to 100 milliliter graduate cylinders and giving a total of 30 inversions at which time they were photographed. The samples were photographed again after they had stood for a 2-hour period. This allowed for the comparison of the intermediate performance with the stability of the emulsion formed. These materials proved to have a much broader utility as emulsifiers with respect to HLB. This was particularly true in the case of the aromatic hydrocarbons as typified by benzene.

Obviously, many modifications and variations of the invention as hereinbefore set forth may be made without departing from the spirit and scope thereof and, therefore, only such limitations should be imposed as are indicated in the appended claims.

I claim:

1. An emulsifying composition comprising (a) a nonionic component comprising a hydrophobic organic material, said organic material selected from the group consisting of fatty acids containing 10–22 carbon atoms in the fatty chain, esters of said fatty acids, vinyl benzenes, vinyl cycloaliphatics, and alcohol esters of higher fatty acids wherein the alcohol portion of the ester contains 1–8 carbon atoms, the hydrocarbon chain of said material having substituted on adjacent carbon atoms hydroxyl and ether substitution characterized by

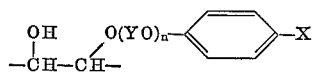

wherein Y is an alkylene group of 2–6 carbons, $n$ is 1–100 and X is an alkyl group containing up to about 22 carbon atoms and (b) an anionic component comprising a water dispersible salt of a member selected from the group consisting of metal, amine and ammonium salts of alkyl substituted aromatic mono sulfonic acids wherein the alkyl radical contains from 8–22 carbon atoms, and diesters of orthophosphoric acid; the ratio of said nonionic component to said anionic component being in the range from 1:9 to 9:1.

2. An emulsifying composition comprising (a) a nonionic component comprising an ester of higher fatty acids, the fatty acyl chains of said ester containing 8–22 carbon atoms and being substituted on adjacent carbon atoms with hydroxyl radicals and ether radicals selected from the group consisting of oxyalkylene condensation products of fatty mercaptans containing 10–22 carbon atoms in the fatty chain, oxyalkylene esters of fatty acids containing 10–22 carbons in the fatty chain, oxyalkylene fatty alcohols containing 10–22 carbon atoms in the fatty chain, and alkoxylated alkyl phenols containing 10–22 carbon atoms in the alkyl chain, the oxyalkylene chains of all said ether radicals containing from 1–100 oxyalkylene groups and (b) a salt of an alkyl substituted aromatic sulfonic acid wherein the alkyl radical contains 8–22 carbon atoms; the ratio of said nonionic component to the said anionic component being in the range from 1:9 to 9:1.

3. The emulsifying composition of claim 2 wherein the esters of higher fatty acids are triglyceride esters.

4. The composition of claim 3 wherein the triglyceride esters are vegetable oil triglycerides.

5. The composition of claim 3 wherein the triglyceride esters are animal fat triglycerides.

6. The composition of claim 3 wherein the triglyceride esters are derived from unsaturated marine oils.

7. An emulsifying composition comprising (a) a nonionic component comprising a triglyceride of fatty acids containing 8–22 carbons in the fatty radicals wherein at least one of the fatty acid radicals of said triglyceride has in the fatty chain hydroxyl and ether substitution characterized by

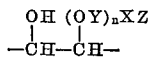

wherein Y is an alkylene group of 2–6 carbons, $n$ is 1–100, X is sulfur or oxygen, and Z is selected from the group consisting of acyl radicals of fatty acids containing 10–22 carbons, phenyl, and alkyl phenyl wherein the alkyl group on said phenyl contains up to about 22 carbon atoms, and (b) an anionic component comprising an alkyl benzene metal sulfonate, wherein the alkyl group contains from 8–22 carbon atoms; the ratio of said nonionic component to said anionic component being in the range from 1:9 to 9:1.

8. An emulsifying composition comprising (a) a nonionic component comprising an ester of a fatty acid of about 10–22 carbons, the fatty acyl chains of said ester having substituted on adjacent carbons an hydroxyl group and an ether radical consisting of the condensation product of nonyl phenol and about 6–20 mols of ethylene oxide, and (b) an anionic component comprising an alkali metal salt of an alkyl benzene sulfonic acid, wherein the alkyl radical contains 8–22 carbon atoms; the ratio of said nonionic component to said anionic component being in the range from 1:9 to 9:1.

References Cited by the Examiner
UNITED STATES PATENTS

| | | | |
|---|---|---|---|
| 2,213,477 | 9/1940 | Steindorff et al. | 252—89 XR |
| 2,696,453 | 12/1954 | Sanders et al. | 252—353 XR |
| 2,731,338 | 1/1956 | Fike et al. | 252—354 XR |
| 2,945,818 | 7/1960 | Costine et al. | 252—353 |
| 3,066,159 | 11/1962 | De Groote et al. | 252—404 |

JULIUS GREENWALD, *Primary Examiner.*